United States Patent Office 2,710,868
Patented June 14, 1955

2,710,868

DERIVATIVES OF BARBITURIC ACID AND METHOD OF PREPARING SAME

André Allais, Jean Benoît Mathieu and Leon Velluz, Paris, France, assignors to Les Laboratoires Francais De Chimiotherapie, Paris, France, a French body corporate No Drawing. Application October 12, 1951,
Serial No. 251,124

Claims priority, application France October 16, 1950

9 Claims. (Cl. 260—257)

The present invention relates to new derivatives of barbituric acid and to a method of producing same.

A considerable number of derivatives of barbituric acid are known. They are characterized by substitution of the labile hydrogen atoms at the carbon atom 5 of barbituric acid of the following structural Formula I:

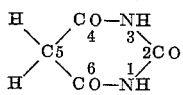

By judicious choice of the substituents it has been possible to a large extent to control the physiological effects of the corresponding molecules even up to the point of creating singular results. Thus it is known at the present time that the hypnotic action revealed in general by the majority of barbiturates may sometimes give way to a stimulating effect upon the animal body or even causing convulsions.

The preparations most frequently adopted in the barbituric acid series comprise as substituents of the carbon atom at position 5 straight chain alkyl (methyl, ethyl, propyl, etc.), branched alkyl (isopropyl, isbutyl, isoamyl, etc.), alkylene (allyl, cyclopentenyl, cyclohexenyl, etc.), aryl and aralkyl (phenyl benzyl, phenyl ethyl, etc. radicals. Less frequently halogen (2-bromoethyl), alkoxyl (2-ethoxyethyl) or amino (1-piperidino) substituted radicals are employed.

The present invention has for its object to provide a new series of barbituric acid derivatives in which at least one of the substituents of the labile hydrogen of the carbon atom at position 5 is a cyclic radical having a juxtanuclear double bond.

The invention relates more particularly to derivatives of barbituric acid, in which said cyclic substituent is the β-cyclohexylidene-ethyl radical $C_6H_{10}=CH-CH_2-$, the structural formula of which is represented by the following Formula II:

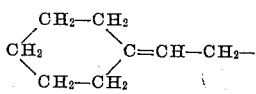

We have found that the introduction of this radical imparts interesting properties to the barbituric acid ring. The invention has thus for its object to provide new derivatives of barbituric acid of the general formula represented by the following Formula III:

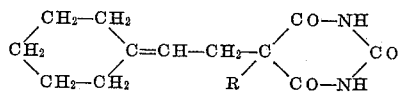

in which one of the substituents at the carbon atom in 5-position is the β-cyclohexylidene-ethyl radical, whilst the other substituent R may be one of the usually employed and known substituents in barbituric acid, for example as previously set forth, a saturated or ethylenic alkyl, straight chain or branched or cyclic alkyl, an aryl or an aralkyl radical, or the β-cyclohexylidene-ethyl radical itself.

Several representatives of the series forming the subject matter of the present invention lend themselves for us. In particular 5(β-cyclohexylidene-ethyl) 5-ethyl barbituric acid (Example 1), complying with the general Formula III in which $R=C_2H_5$, exercises mainly analeptic respiratory effects and is of medical interest.

The invention also has for its object a method of producing said derivatives of barbituric acid.

In the preparation of barbituric acid derivatives there are utilized as intermediate material β-cyclohexylidene ethyl malonic esters of the following Formula IV:

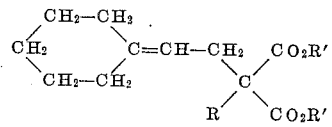

in which R has the same meaning as above and R' represents an alkyl radical, preferably a lower alkyl radical, the radical ethyl being the one most frequently employed.

The method of preparing said malonic esters consists in condensing a β-cyclohexylidene-ethyl halide, for example β-cyclohexylidene-ethyl bromide of the formula $C_6H_{10}=CH-CH_2Br$ (P. Karrer and F. Kehrer in "Helv. chim. Acta," 1942, vol. 25, page 29), with monosubstituted malonic ester of the following Formula V:

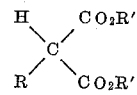

in which R and R' have the same meaning as defined above. Condensation is effected in the presence of an alkaline agent such as sodium ethylate, and in an organic solvent, for example ethanol, benzene or ethyl carbonate.

According to a modification of the process, the malonic ester is not substituted (R then represents hydrogen), and the second substituent is introduced into the β-cyclohexylidene ethyl malonic ester, (obtained by condensation of a β-cyclohexylidene ethyl halide with a non-substituted malonic ester), by condensation with an alkyl or aralkyl halide under the same operative conditions as those described for the above mentioned condensation.

The invention has also for its object to provide as new industrial products, the aforesaid β-cyclohexylidene ethyl malonic esters, which are the intermediate substances employed in the method of producing new derivatives of barbituric acid according to the invention.

The method of preparing 5-β-cyclohexylidene ethyl barbituric acids (III) using as intermediate materials having the constitution of β-cyclohexylidene ethyl malonic esters (IV) consists in condensing these latter with urea in the presence of an alkaline condensing agent, such as sodium ethylate, and in an organic solvent, for example ethanol or benzene.

In the examples quoted hereinafter there is furnished a detailed description of the preparation of certain substituted β-cyclohexylidene ethyl malonic esters and of the corresponding 5-(β-cyclohexylidene ethyl) barbituric acid derivatives, it being understood that the details of execution described may be subject to various changes and modifications, and that the present invention is not limited to the particular derivatives referred to.

EXAMPLE 1

*Preparation of (β-cyclohexylidene ethyl) ethyl malonic acid ethyl ester*

This compound is represented by Formula IV in which $R=R'=C_2H_5$.

To a solution of 12 g. of ethyl malonic acid ethyl ester (formula V, $R=R'=C_2H_5$) in 40 cc. of ethyl carbonate in the presence of sodium ethylate prepared by reacting 1.5 g. of sodium and 30 cc. of ethyl alcohol, there is added drop by drop a solution of 15 g. of β-cyclohexylidene-ethyl bromide in 20 cc. of ethyl carbonate.

After heating for one hour at 100° C. the mixture is treated with water, subjected to ether extraction and the ether extract is concentrated in a vacuum.

The (β-cyclohexylidene-ethyl) ethyl malonic acid ethyl ester is a liquid soluble in the majority of organic solvents and distils at 146–147° C. at a pressure of 2 mm. Yield: 60%.

Analysis:
    Calculated, percent_____ C, 68.9; H, 9.5
    Found, percent_____ C, 68.9; H, 9.7

*Preparation of 5-(β-cyclohexylidene-ethyl) 5-ethyl barbituric acid*

This substance is represented by Formula III, in which R=C₂H₅.

An alcoholic solution of 12 g. of (β-cyclohexylidene-ethyl) ethyl malonic acid ethyl ester previously prepared and 6 g. of urea are refluxed for 48 hours in the presence of sodium ethylate prepared by reacting 2 g. of sodium and 40 cc. of ethyl alcohol.

After neutralization of the alkaline solution and distillation of the solvent, the product is treated with water and subjected to ether extraction.

The ether solution on concentration by evaporation in a vacuum yields a residue which, on recrystallization in 50% ethanol, yields the corresponding substituted barbituric acid with a yield of 60%.

This compound is obtained in the form of colourless crystals, it is very soluble in alcohol or ether, slightly soluble in water and insoluble in petrol ether, and has a melting point of 165° C.

Analysis:
    Calculated, percent_____ C, 63.6; H, 7.6; N, 10.6
    Found, percent_____ C, 63.7; H, 7.8; N, 10.8

EXAMPLE 2

*Preparation of (β-cyclohexylidene-ethyl)phenyl malonic acid ethyl ester*

(Formula IV, in which R=C₆H₅, R'=C₂H₅)

A solution of 30 g. of β-cyclohexylidene-ethyl bromide in ethyl carbonate is added drop by drop to a solution of 30 g. of phenyl malonic acid ethyl ester in ethyl carbonate in the presence of sodium ethylate prepared by reacting 3 g. of sodium and 60 cc. of ethyl alcohol.

After refluxing for an hour, the mixture is treated with water, subjected to ether extraction and the ether extract is concentrated in a vacuum.

The (β-cyclohexylidene-ethyl) phenyl malonic acid ethyl ester is a liquid soluble in the majority of organic solvents and distils at 167–169° C. at a pressure of 1 mm. The yield is 65%.

Analysis:
    Calculated, percent_____C, 73.2; H, 8.2
    Found, percent_____ C, 73.3; H, 8.2

*Preparation of 5-(β-cyclohexylidene-ethyl) 5-phenyl-barbituric acid*

(Formula III in which R=C₆H₅)

An alcoholic solution of 10 g. of (β-cyclohexylidene-ethyl) phenyl malonic acid ethyl ester previously prepared and 4.5 g. of urea are refluxed for 16 hours in the presence of sodium ethylate prepared by reacting 1.5 g. of sodium and 30 cc. of ethyl alcohol.

After neutralization of the alkaline solution and distillation of the solvent, the product is treated with water and subjected to ether extraction.

From the concentrated ethereal solution a residue is obtained which, by recrystallization in alcohol, yields the corresponding substituted barbituric acid in a yield of 50%.

The product is obtained in the form of colourless crystals, which are very soluble in acetone, soluble in ether or ethanol and insoluble in petrol ether, and has a melting point of 216° C.

Analysis:
    Calculated, percent_____ C, 69.2; H, 6.5; N, 9.0
    Found, percent_____ C, 69.4; H, 6.5; N, 9.2

EXAMPLE 3

This example refers to the modification of the process previously referred to which consists in condensing β-cyclohexylidene-ethyl bromide with a non-substituted malonic ester and thereafter introducing the second substituent by a similar condensation.

*Preparation of (β-cyclohexylidene-ethyl) malonic acid ethyl ester*

(Formula IV in which R=H, R'=C₂H₅)

40 g. of β-cyclohexylidene-ethyl bromide are added drop by drop to a solution, while heating under reflux, of 30 g. of ethyl malonate in 75 cc. of alcohol containing sodium ethylate prepared by reacting 4 g. of sodium and 80 cc. of ethyl alcohol. After half an hour refluxing the alcohol is distilled, the residue treated with water and subjected to ether extraction, and the ether extract is concentrated in a vacuum.

The (β-cyclohexylidene-ethyl) malonic acid ethyl ester is a liquid soluble in the majority of organic solvents and distills at 129–131° C. at a pressure of 2 mm. Yield: 50%.

Analysis:
    Calculated, percent_____ C, 67.1; H, 9.0
    Found, percent_____ C, 67.2; H, 9.0

*Preparation of bis-(β-cyclohexylidene ethyl) malonic acid ethyl ester*

(Formula IV in which R=β-cyclohexylidene ethyl, R'=C₂H₅)

A solution of 20 g. of β-cyclohexylidene-ethyl bromide in ethyl carbonate is added drop by drop to a solution of 25 g. of (β-cyclohexylidene-ethyl) malonic acid ethyl ester previously prepared, in the presence of sodium ethylate prepared by reacting 2.2 g. of sodium and 45 cc. of ethyl alcohol.

After heating for one hour to 130° C. the mixture is treated with water, subjected to ether extraction and the ether solutions concentrated in a vacuum.

The bis-(β-cyclohexylidene ethyl) malonic acid ethyl ester is a liquid soluble in the majority of organic solvents and distills at 174–175° C. at a pressure of 2.5 mm. Yield: 70%.

Analysis:
    Calculated, per cent _____ C, 73.4; H, 9.6
    Found, per cent _____ C, 73.4; H, 9.7

*Preparation of 5.5-bis (β-cyclohexylidene-ethyl) barbituric acid*

(Formula III in which R=β-cyclohexylidene-ethyl)

An alcoholic solution of 9 g. of bis-(β-cyclohexylidene-ethyl) malonic acid ethyl ester obtained as described above and 3.5 g. of urea are refluxed for 16 hours in the presence of sodium ethylate prepared by reacting 1.2 g. of sodium and 25 cc. of ethyl alcohol.

After neutralization and distillation of the solvent the product is treated with water and subjected to ether extraction.

The ethereal solution is concentrated in a vacuum whereby a residue is obtained which, upon recrystallization in ethanol, yields the corresponding substituted barbituric acid. The yield is 30%.

The new barbituric acid derivative forms colourless crystals which are very soluble in alcohol, acetone, benzene or ether and insoluble in petrol ether, having a melting point of 212° C.

Analysis:
Calculated, per cent _____ C, 69.7; H, 8.2; N, 8.1
Found, per cent _____ C, 69.7; H, 8.1; N, 8.3

EXAMPLE 4

*Preparation of (β-cyclohexylidene-ethyl) methyl malonic acid ethyl ester*

(Formula IV in which R=CH₃ and R'=C₂H₅)

A solution of 15 g. of β-cyclohexylidene-ethyl bromide in 30 cc. of ethyl carbonate is added drop by drop to a solutions of 12 g. of methyl malonate in 24 cc. of ethyl carbonate, in the presence of sodium ethylate prepared by reacting 1.6 g. of sodium and 55 cc. of ethyl alcohol.

After heating for two hours at 100°, the mixture is treated with water and subjected to ether extraction. The ethereal solution is concentrated in a vacuum.

The (β-cyclohexylidene-ethyl) methyl malonic acid ethyl ester is a liquid soluble in the majority of organic solvents and distills at 128–129° at a pressure of 1.5 mm. The yield is 75%.

Analysis:
Calculated, per cent _____ C, 68.0; H, 9.3
Found, per cent _____ C, 67.7; H, 9.5

*Preparation of (β-cyclohexylidene-ethyl) methyl barbituric acid*

(Formula III in which R=CH₃)

A solution of 10 g. of (β-cyclohexylidene-ethyl) methyl malonic acid ethyl ester and 5.5 g. of urea in 30 cc. of ethyl alcohol is refluxed for twenty hours in the presence of sodium ethylate prepared by reacting 1.5 g. of sodium and 45 cc. of ethyl alcohol.

After neutralization and distillation of the solvent, the product is treated with ether.

From the ethereal solution concentrated in a vacuum, a residue is obtained which, by recrystallization in alcohol, yields the corresponding barbituric acid in a yield of 70%.

Said barbituric acid is in the form of colourless crystals melting at 216° F., highly soluble in acetone, less soluble in benzene and ether, and insoluble in petrol ether.

Analysis:
Calculated, per cent _____ C, 62.4; H, 7.2; N, 11.2
Found, per cent _____ C, 62.4; H, 7.2; N, 11.2

EXAMPLE 5

By starting with the equimolecular amount of amyl malonic acid ethyl ester, instead of ethyl malonic acid ethyl ester in Example 1 and by proceeding as described in said example, (β-cyclohexylidene ethyl) amyl malonic acid ethyl ester and, therefrom, 5-(β-cyclohexylidene ethyl)-5-amyl barbituric acid are obtained.

In the place of amyl malonic acid ethyl ester, there may be used:

n-Propyl malonic acid ethyl ester, to yield (β-cyclohexylidene ethyl) n-propyl malonic acid ethyl ester and, therefrom, 5-(β-cyclohexylidene ethyl)-5-n-propyl barbituric acid;

Isopropyl malonic acid ethyl ester, to yield (β-cyclohexylidene ethyl) isopropyl malonic acid ethyl ester and, therefrom, 5-(β-cyclohexylidene ethyl)-5-isopropyl barbituric acid;

Dodecyl malonic acid ethyl ester, to yield (β-cyclohexylidene ethyl) dodecyl malonic acid ethyl ester and, therefrom, 5-(β-cyclohexylidene ethyl)-5-dodecyl barbituric acid;

Ethyl malonic acid methyl ester, to yield (β-cyclohexylidene ethyl) ethyl malonic acid methylester and, therefrom, 5-(β-cyclohexylidene ethyl)-5-ethyl barbituric acid;

Amyl malonic acid amyl ester to yield (β-cyclohexylidene ethyl) amyl malonic acid amyl ester and, therefrom, 5-(β-cyclohexylidene ethyl)-5-amyl barbituric acid.

EXAMPLE 6

By starting with the equimolecular amount of tolyl malonic acid ethyl ester, in the place of phenyl malonic acid ethyl ester in Example 2, and by proceeding as described therein, (β-cyclohexylidene ethyl) tolyl malonic acid ethyl ester and, therefrom, 5-(β-cyclohexylidene ethyl)-5-tolyl barbuturic acid are obtained.

In the place of tolyl malonic acid ethyl ester, there may be used:

Benzyl malonic acid ethyl ester, to yield (β-cyclohexylidene ethyl) benzyl malonic acid ethyl ester and, therefrom, 5-(β-cyclohexylidene ethyl)-5-benzyl barbituric acid;

Phenyl ethyl malonic acid ethyl ester, to yield (β-cyclohexylidene ethyl) phenyl ethyl malonic acid ethyl ester and therefrom, 5-(β-cyclohexylidene ethyl)-5-phenyl ethyl barbituric acid.

In the place of sodium ethylate, there may be used, as alkaline condensing agent, sodium amide, sodium cyanamide, and others. The yield obtained with sodium ethylate, however, is usually higher than the yield obtained with other alkaline condensing agents.

While certain representative embodiments and details of the invention have been shown for the purpose of illustrating the same, it will be apparent to those skilled in this art that various changes and modifications may be made therein without departing from the spirit or scope of the invention.

I claim:

1. A method of preparing 5-(β-cyclohexylidene-ethyl) barbituric acids of the formula

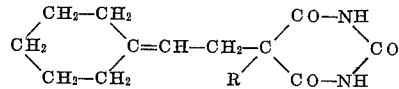

in which R represents a radical selected from the group consisting of a lower alkyl, benzyl, phenyl ethyl, phenyl, and β-cyclohexylidene ethyl radical, said method comprising condensing in an organic solvent medium, in the presence of an alkaline condensing agent, a β-cyclohexylidene ethyl malonic acid ester of the formula

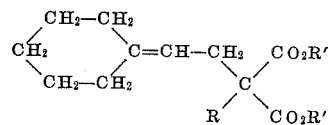

in which R is one of said radicals and R' represents a lower alkyl radical, with urea.

2. A method of preparing 5-(β-cyclohexylidene-ethyl) barbituric acids of the formula

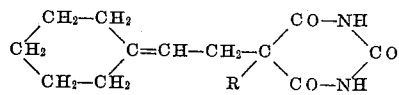

in which R represents a radical selected from the group consisting of a lower alkyl, benzyl, phenyl ethyl, phenyl, and β-cyclohexylidene ethyl radical, said method comprising condensing in an organic solvent medium, in the presence of sodium ethylate, a β-cyclohexylidene-ethyl malonic acid ester of the formula

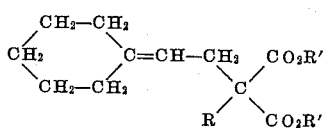

in which R is one of said radicals and R' represents a lower alkyl radical, with urea.

3. A method according to claim 1, wherein said β-cyclohexylidene-ethyl malonic acid ester of the formula

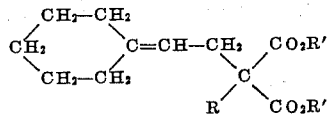

in which R represents a radical selected from the group consisting of a lower alkyl, benzyl, phenyl ethyl, phenyl, and β-cyclohexylidene ethyl radical, and R′ represents a lower alkyl radical, as obtained by condensation in an organic solvent medium, in the presence of an alkaline condensing agent, of β-cyclohexylidene-ethyl halide of the formula

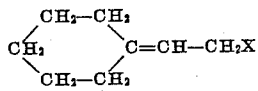

in which X represents halogen, with a malonic acid ester of the formula

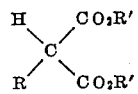

in which R and R¹ represent respectively the above mentioned radicals.

4. As new compositions of matter, 5-(β-cyclohexylideneethyl) barbituric acids of the formula

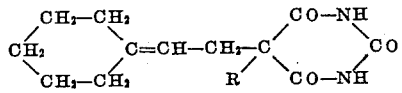

in which R is a radical selected from the group consisting of a lower alkyl, benzyl, phenyl ethyl, phenyl, and β-cyclohexylidene ethyl radical.

5. As a new compound, the 5-(β-cyclohexylidene ethyl)-5-ethyl barbituric acid.

6. As a new compound, the 5-(β-cyclohexylidene ethyl)-5-phenyl barbituric acid.

7. As a new compound, the 5-(β-cyclohexylidene ethyl)-5-methyl barbituric acid.

8. As a new compound, the 5,5-bis-(β-cyclohexylidene ethyl) barbituric acid.

9. In a process of preparing 5-(β-cyclohexylidene ethyl) barbituric acids according to claim 1, wherein the alkaline condensing agent is an alkali alcoholate.

References Cited in the file of this patent
UNITED STATES PATENTS

| | | |
|---|---|---|
| 2,019,936 | Shonle | Nov. 5, 1935 |
| 2,090,594 | Jacobson | Aug. 17, 1937 |
| 2,363,045 | De Groote | Nov. 21, 1944 |
| 2,386,446 | De Groote | Oct. 9, 1945 |

OTHER REFERENCES

Allais et al., Ann. Pharm. Franc. 9, 275–282 (Apr. 1951).